United States Patent [19]
Harkness

[11] 3,754,543
[45] Aug. 28, 1973

[54] ROPE STARTER FOR SMALL ENGINES

[75] Inventor: Joseph R. Harkness, Germantown, Wis.

[73] Assignee: Briggs & Stratton Corporation, Wauwatosa, Wis.

[22] Filed: Mar. 10, 1972

[21] Appl. No.: 233,544

[52] U.S. Cl. .................................. 123/185 B, 74/6
[51] Int. Cl. ............................................. F02n 3/02
[58] Field of Search .................... 123/185 R, 185 A, 123/185 B, 185 BA, 185 BB, 185 D, 185 F, 185 G, 185 N, 185 P, 185 S; 74/6

[56] References Cited
UNITED STATES PATENTS

| | | | |
|---|---|---|---|
| 2,568,359 | 9/1951 | Palfi | 123/185 BA |
| 2,604,882 | 7/1952 | Schnacke | 123/185 BA |
| 2,772,669 | 12/1956 | Armstrong | 123/185 BA |
| 2,938,511 | 5/1960 | Pike et al. | 123/185 BA |
| 3,010,443 | 11/1961 | Lyvers | 123/185 BA UX |
| 3,081,759 | 3/1963 | Mauck et al. | 123/185 BA X |
| 3,270,732 | 9/1966 | Harkness | 123/185 BA X |
| 3,332,410 | 7/1967 | Dwyer, Jr. | 123/185 BA |
| 3,366,099 | 1/1968 | Kaufman | 123/185 BA |
| 3,375,814 | 4/1968 | Hamman | 123/185 A |

*Primary Examiner*—Al Lawrence Smith
*Attorney*—Ira Milton Jones

[57] ABSTRACT

A rope rewind pulley, concentric with an engine crankshaft, has a hub portion comprising a male helical spline member. A driving clutch element comprising a female helical spline is mounted on said hub portion for limited axial motion therealong upon relative rotation, and then, upon engaging a driven clutch element concentrically fixed to the crankshaft, for rotation with the pulley part. The pulley part and driving clutch element are of plastic and are carried either on the crankshaft or on a stub shaft fixed to a recoil spring housing. Co-operating fixed and movable magnet members are provided to inhibit rotation of the driving clutch element to cause it to move axially upon initial rotation of the hub portion.

3 Claims, 5 Drawing Figures

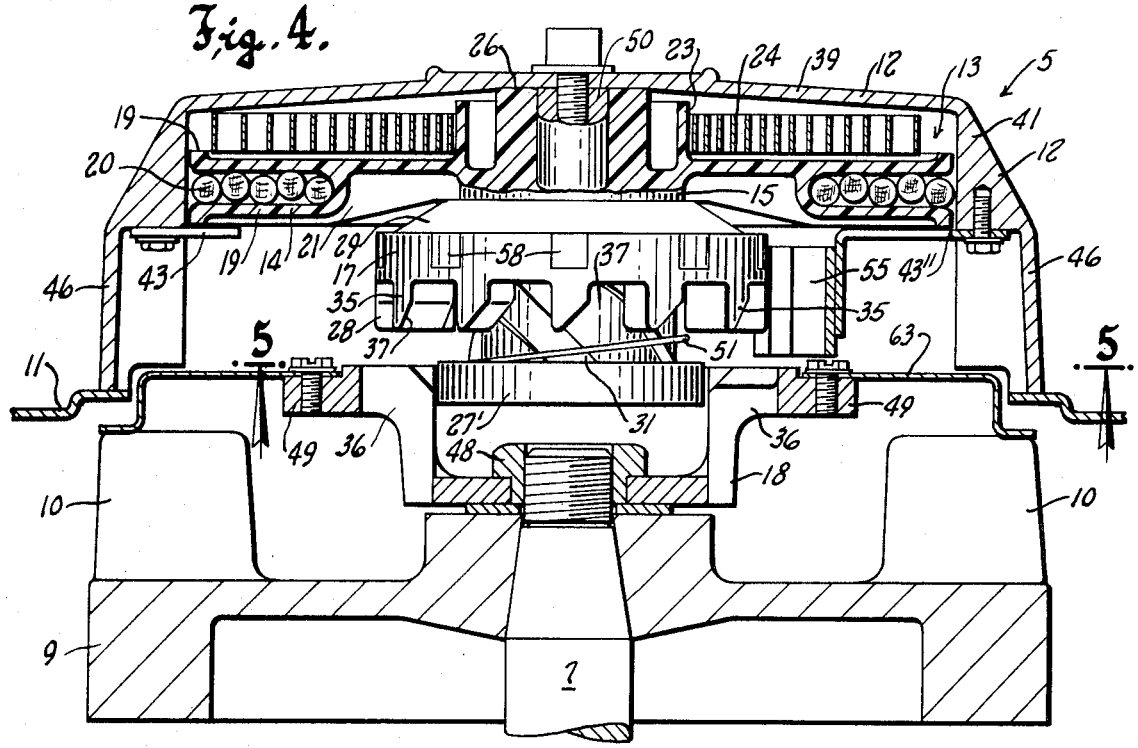
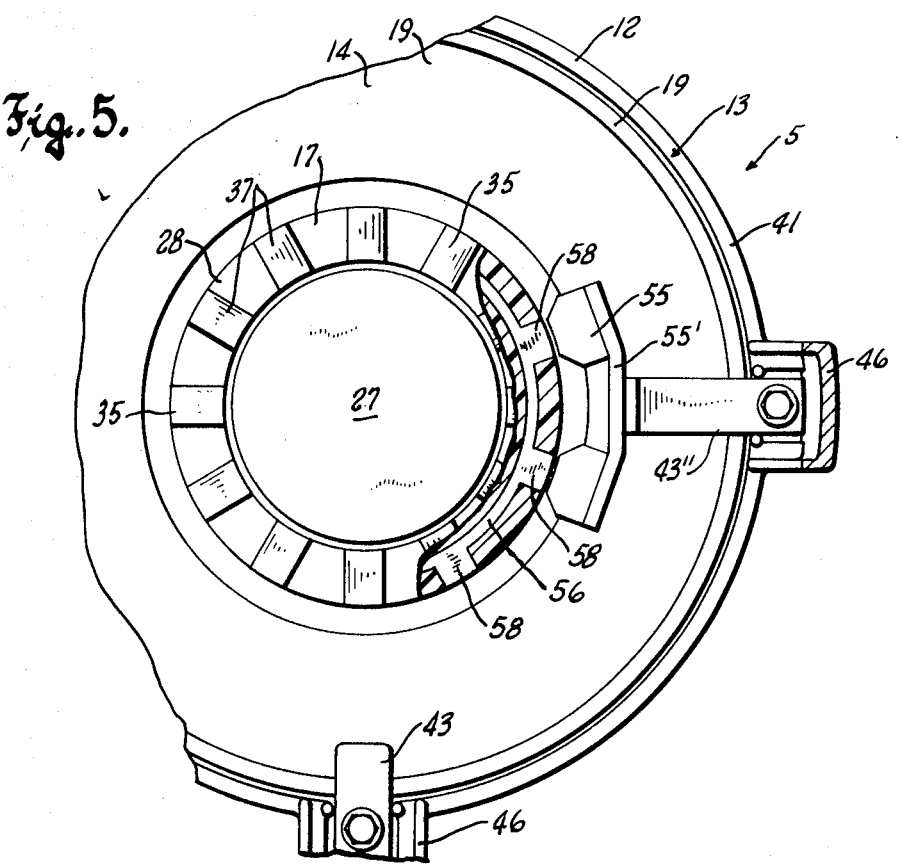

ROPE STARTER FOR SMALL ENGINES

This invention relates to rope starters for small internal combustion engines, and pertains more specifically to so-called Bendix-type rope starters wherein there is a helically splined connection between a rope pulley and a driving clutch element, which connection causes the driving clutch element to be moved axially toward driving engagement with a driven clutch element in consequence of relative rotation between the rope pulley and the driving clutch element.

A general object of the present invention is to provide a Bendix-type self-rewinding rope starter for small reciprocating engines that is particularly suitable for use as an auxiliary manual starter on an engine that is equipped with an electric starter.

In the past, rewind rope starters for small engines have incorporated an overrunning clutch which automatically engaged upon any relative rotation in one direction between the rope pulley of the starter and the engine crankshaft, and which was disengaged by opposite relative rotation between those elements. A rope starter incorporating such an overrunning clutch could be built as a very compact and inexpensive structure, and from that standpoint it was desirable for installation as an auxiliary manual starter on an engine equipped with an electric starter. However, the overrunning clutch had the serious disadvantage that it did not disengage when the engine backfired.

A backfire of course occurs when a charge of combustible mixture in an engine cylinder ignites before the piston reaches top dead center in its compression stroke and at a time when the crankshaft is rotating too slowly for flywheel momentum to carry the piston through top dead center. When this happens, the force of the combusting charge drives the piston back down, rotating the crankshaft oppositely to its normal running direction. Since many small engines do not provide for sufficient advance and retardation of the ignition spark to insure against ignition before top dead center, the possibility of backfiring must be considered inevitable in a small engine.

When backfiring occurs with a starter equipped with an overrunning clutch, the clutch remains engaged during reverse rotation of the crankshaft. If the clutch is incorporated in a rope starter, a substantial part of the force of the backfire is imposed upon the starter rope. When the rope starter is being used for engine starting, that force is transmitted to the operator's arm as an abrupt jerk, and his yielding resistance to that jerk tends to cushion the shock to the rope and starter mechanism. However, where such a rope starter is used only for auxiliary starting, and a backfire occurs during an attempted start with the electric starter, the force of the backfire is transmitted to the T-handle of the pull rope, which is seated against its stop, and it imposes a considerable strain upon that handle and other components of the rope starter mechanism.

Normal stopping of an engine can impose a similar strain upon a rope starter mechanism incorporating an overrunning clutch. As the engine coasts to a stop it goes through a compression stroke, and in a fairly high percentage of stops it does not continue through that stroke but turns backward before reaching the end of it, under the force of the compression. Such roll-back engages the overrunning clutch and imposes the force of the compression upon the rope starter mechanism.

The repeated straining of the rope starter in backfiring and stopping can in time tear the rope pull handle and damage other parts of the rope starter mechanism.

With the foregoing considerations in mind, it is an object of this invention to provide a rope starter for small engines that does not incorporate an overrunning clutch, and wherein the rope pulley is uncoupled from the engine crankshaft except only at times when cranking tension is being applied to the starting rope.

Another and more specific object of this invention in one of its embodiments is to provide a so-called Bendix-type rope starter that has all of its elements carried by an end portion of the engine crankshaft, so that assembly of the mechanism is facilitated, concentricity of the rotating starter parts is assured, and the forces imposed upon the starter mechanism during starting are taken by the crankshaft and its bearings, which are inherently well adapted to receive such forces, instead of being transferred to a lighter metal starter housing and the supporting structure on which it is carried by the engine body.

It is also an object of this invention to provide a simple, compact and inexpensive Bendix-type rope starter that can be incorporated in an engine rather inexpensively because it does not require gear teeth to be formed on the circumference of the engine flywheel.

Another specific object of this invention is to provide an engine starter of the character described that can have most of its major components formed of plastic material to greatly reduce the noise heretofore produced by clatter of metallic starter parts when the engine is running.

A further specific object of this invention is to provide a Bendix-type starter having novel rotation inhibiting means for its driving clutch element that has no frictional engagement between moving parts.

With these observations and objectives in mind, the manner in which the invention achieves its purpose will be appreciated from the following description and the accompanying drawings, which exemplify the invention, it being understood that changes may be made in the specific apparatus disclosed herein without departing from the essentials of the invention set forth in the appended claims.

The accompanying drawings illustrate several complete examples of embodiments of the invention constructed according to the best modes so far devised for the practical application of the principles thereof, and in which:

FIG. 4 is a view generally similar to FIG. 2 but illustrating another modified embodiment of the invention; and FIG. 5 is a fragmentary sectional view taken mainly on the plane of the line 5—5 in FIG. 4.

Figure 1:
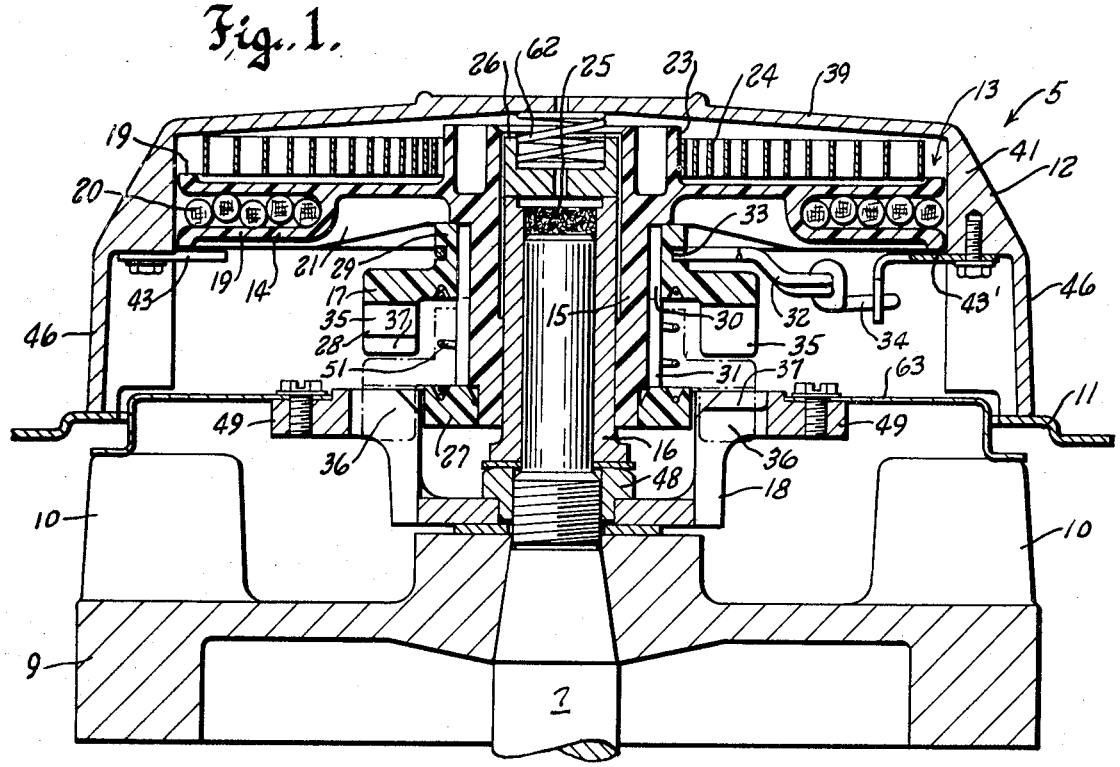
FIG. 1 is a fragmentary sectional view, taken substantially on the plane of the engine crankshaft axis, of an engine starter embodying the principles of this invention.

Referring now more particularly to the accompanying drawings, the numeral 5 designates generally a starter embodying the principles of this invention and by which rotation can be imparted to the crankshaft 7 of a small gasoline engine. As is conventional, a flywheel 9 is mounted on one end portion of the crankshaft, at a distance inwardly from the adjacent end thereof, and is formed with vanes 10 to blow cooling air across the engine body as the flywheel rotates. A shroud 11 around the flywheel and the engine body serves to confine and direct the cooling air stream. The shroud is secured to the engine body, and in turn it supports a recoil spring housing 12 that is spaced a small distance beyond the end of the crankshaft and is substantially coaxial with it.

In the embodiment of the invention disclosed in FIG. 1, which will now be described, most of the components of the starter 5 are carried on the crankshaft axially outwardly of the flywheel.

The rope starter 5 comprises a pulley part 13 which is mounted on the outer end portion of the crankshaft for rotation relative thereto. The pulley part comprises a rope pulley 14 that is inwardly adjacent to the spring housing 12, and an integral hub-like portion 15 that is formed as a male helical spline member which extends axially inwardly along the crankshaft from the pulley. The starter also comprises a bushing 16 upon which the pulley part is journaled on the crankshaft, a driving clutch element 17 that comprises a female helical spline member, and a driven clutch element 18 concentrically secured to the axially outer face of the flywheel.

The pulley part 13 and the driving clutch element 17 are preferably molded of two different plastics, such as nylon for the pulley part and Delrin for the driving clutch element, so that these components will not impose a large amount of weight on the crankshaft and will have little tendency to produce noise under the influence of engine vibration. The driven clutch element 18 is preferably an aluminum alloy die casting. It is secured either directly to the flywheel or, as here shown, is secured to the engine crankshaft, directly in front of the flywheel, by means of a nut 48 threaded onto the crankshaft. Radially outwardly projecting lugs 49 on the driven clutch element provide for securement to it of the conventional rotating cooling air screen 63.

The pulley 14 is formed with flanges 19 between which a pull rope 20 is coiled around it and as shown it has radially extending stiffening ribs 21 on its axially opposite faces, for high strength and light weight. The pull rope has its inner end secured to the pulley in a known manner. In addition to the axially inwardly projecting male helical spline member 15, the pulley part also has a short hub portion 23 which projects axially outwardly into the spring housing 12 to have the inner end of a rewind spring 24 secured thereto and the spring coiled around it.

During engine operation the pulley part 13 is normally stationary while the crankshaft rotates at high speed inside it. To provide a suitable bearing, the bushing 16 is interposed between the pulley part and the crankshaft. The bushing is preferably made of sintered iron, impregnated with oil, so that the crankshaft can rotate inside it with little friction. In cross section the bushing has a non-circular external profile, and it is received in a closely fitting correspondingly non-circular bore in the pulley part so that it and the pulley part are confined against rotation relative to one another. The bushing projects outwardly a short distance beyond the end of the crankshaft, and its bore in this projecting portion accommodates an oiling felt 25. A cup-shaped cap 26, which can be confined in a bore in the outwardly projecting hub portion of the pulley part, holds the felt in place. A compression spring 62, reacting between the cap 26 and the end wall of the spring housing 12, in turn holds the cap and further serves as a frictional damper that prevents whirling-type vibration of the bushing 16 against the end porton of the crankshaft that it surrounds.

The driving clutch element 17 coaxially surrounds the male helical spline portion 15 of the pulley part. It comprises a clutch portion 28 and an integral smaller diameter hub portion 29 that extends axially outwardly from the clutch portion. In the bore of the driving clutch element there is a female helical spline 30 which cooperates with the male helical spline 31 on the pulley part to translate relative rotation between the driving clutch element and the pulley part into axial motion of the driving clutch element along the male helical spline member. Such relative rotation and axial motion is limited, since the limits of travel of the driving clutch element are defined by the pulley 14 and a plastic collar 27 that is secured, as by sonic welding, to the axially inner end of the pulley part and defines a circumferential radially outwardly projecting shoulder. This collar can serve as a seat for a light compression spring 51 that surrounds the male helical spline member and biases the driving clutch element axially outwardly.

Upon its engagement with the collar 27 the driving clutch element is constrained by its splined connection with the pulley part to rotate in unison with the pulley part, thus imparting torque to the driven clutch element 18.

To inhibit rotation of the driving clutch element with the pulley part when the rope pulley is initially rotated during starting, so that the driving clutch element is induced to move axially into engagement with the driven clutch element 18, a drag yoke 32 frictionally embraces the driving clutch element. The drag yoke can be made of spring wire and can have its legs received in a closely fitting groove 33 in the hub portion 29. The yoke is so connected with the spring housing 12, by means of a link 34, that it is substantially confined against rotation about the crankshaft axis but can have limited translatory motion along it.

The clutch portion 28 of the driving clutch element has vane-like teeth 35 which extend radially and project axially inwardly to interengage with mating teeth 36 on the driven clutch element. The teeth on at least one of the clutch elements are beveled or chamfered, as at 37, to minimize the likelihood of edgewise abutment of the teeth on the respective clutch elements, although if such engagement occurs the teeth will soon slip into meshing engagement under the influence of the torque forces acting upon the clutch elements.

Once the clutch elements are meshingly engaged, they tend to remain in mesh because the working areas of the teeth on both clutch elements have flat surfaces. Of course, as soon as the engine begins to run at a speed faster than the pulley part is being rotated, the driving clutch element is shifted axially out of engagement with the driven clutch element by the splined connection between the driving clutch element and the pulley part.

When tension on the pull rope is released after a manual start, the recoil spring 24 rotates the pulley part in the direction to rewind the rope, and such reverse rotation of the pulley part brings the driving clutch element to the axially outer limit of its travel along the male helical spline member, where it is spaced from the driven clutch element. Such return motion of the driving clutch element is assisted by a light compression spring 51 that surrounds the male helical spline element and reacts between the collar 27 and the driving clutch element. That spring of course insures that the clutch elements will remain spaced apart when the engine is running.

The housing 12 for the rope rewind spring has a generally circular end wall 39 and a side wall 41 that extends axially inwardly therefrom, substantially concentric to the crankshaft. Axially inwardly extending mounting legs 46 for supporting the spring housing 12 on the shroud 11 are formed integrally with the side wall of the spring housing. Tab-like members 43, secured to the side wall 41 and projecting radially inwardly from it, flatwise underlie the axially inner face of the pulley 14 and thus confine the pulley part against all but very limited axial motion. One of these tab-like members, designated 43', is L-shaped and carries the link 34 that supports the drag yoke 32 for axial motion. Since the side wall 41 of the spring housing rather closely surrounds the pulley 14, the latter cooperates with the spring housing 12 to completely enclose the rewind spring 24, which is confined edgewise between the pulley and the end wall 39 of the housing and has its outer end secured to the housing side wall. The pull rope 20 extends out from the pulley through a hole in the side wall of the spring housing.

It will be apparent that if the rope starter of this invention is employed as an auxiliary starter, the clutch elements 17 and 18 will normally be in axially spaced apart relationship during starting with the electric starter, and will also be in that relationship when the engine runs and when it stops, so that no strain will be imposed upon the rope starter mechanism by a backfire during electric starting or by roll-back during stopping.

The arrangement of the starter with most of its components carried by the engine crankshaft, as above described is advantageous in that it imposes the lateral forces of rope pull upon the crankshaft and its bearings, which are well adapted to receive such forces. However, it has the disadvantage that during engine operation the crankshaft always rotates at high speed relative to the pulley part, and therefore the bushing 16 must fit the crankshaft accurately and must be well lubricated. This problem is obviated by the arrangement illustrated in FIG. 2, wherein only the driven clutch element 18 is carried by the crankshaft, and the other components of the starter are all carried by the spring housing 12, and more particularly by a stub shaft 50 which projects axially inwardly from the end wall 39 of the spring housing, toward the adjacent end portion of the crankshaft and concentrically therewith. The stub shaft need not extend the full axial length of the pulley part, but, as shown, can extend down into a concentric well in it so that the closed bottom of that well tends to keep dirt out of it. Since the stub shaft is fixed, and the pulley part rotates at comparatively slow speed relative to it — and only during engine starting — the plastic pulley part can be journaled directly on the stub shaft.

Figure 2:
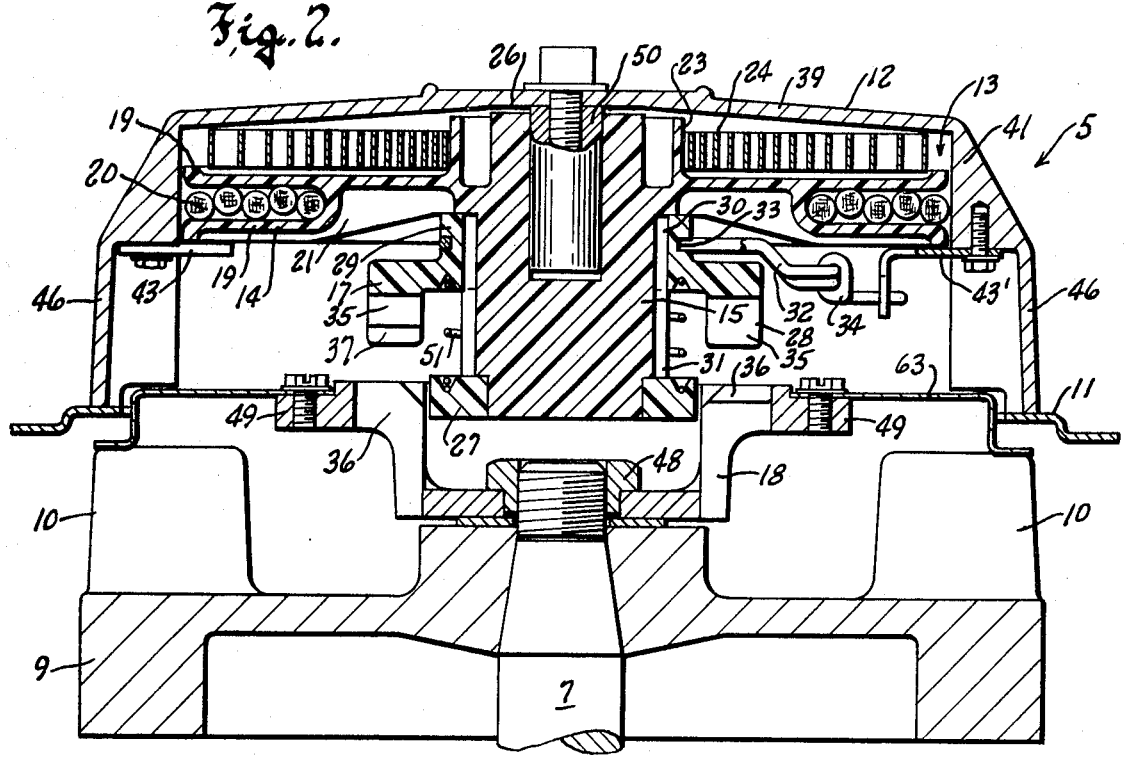
FIG. 2 is a view generally similar to FIG. 1 but illustrating a modified embodiment of the invention.
Figure 3:
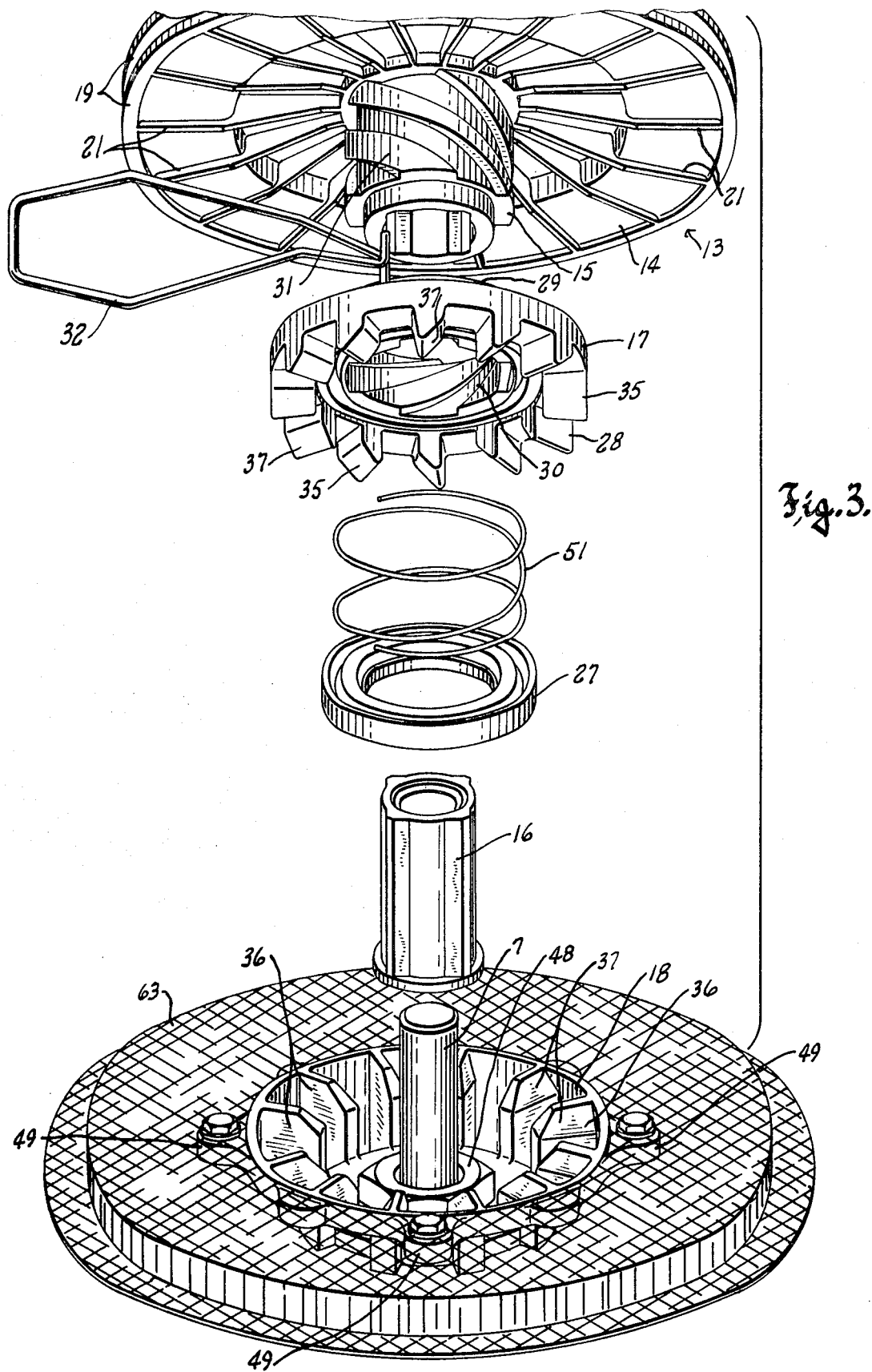
FIG. 3 is an exploded perspective view of the principal components of the starter, which components are common to the embodiments of both FIG. 1 and FIG. 2.

In other respects the embodiment of the invention illustrated in FIG. 2 is identical with that of FIG. 1.

The embodiment of the invention that is illustrated in FIGS. 4 and 5 differs from the embodiments previously described in that it does not have the spring wire drag yoke 32 for inhibiting rotation of its driving clutch element when the pulley part is rotated. Instead, the L-shaped tab-like member 43'' comprises a bracket that carries two permanent magnets 55 which cooperate with a magnetically permeable bar 55' in an assembly that comprises in effect a single horseshoe magnet. This permanent magnet means has its pole surfaces facing radially toward the circumference of the driving clutch element, to cooperate with teeth 58 on a gear-shaped magnetically permeable part 56 that is embedded in the driving clutch element.

To accommodate the gear shaped part 56 the body of the driving clutch element can by cylindrical, there being no need for the reduced diameter axially outer end portion in which the above mentioned yoke groove 33 is formed.

The gear shaped part comprises a ring portion that has an outside diameter substantially smaller than that of the driving clutch element, and integral radially outwardly projecting tooth portions 58, each of which has its radially outer face flush with the cylindrical surface of the driving clutch element. The gear shaped part is so spaced axially from the ends of the driving clutch element as to be in line with the permanent magnet means 55 when the driving clutch element is at the outer limit of its axial travel. Its tooth portions 58 are spaced apart circumferentially in correspondence with the spacing between the magnet pole faces. Hence as the gear shaped part rotates with the driving clutch element, successive pairs of its tooth portions come into alignment with the magnet poles, and flux is charged through them and the segment of the ring portion 57 that connects them, whereby the clutch element is yieldingly restrained against rotation by magnetic attraction.

This magnetic retarding means is not affected by dirt, and since its cooperating magnetic elements are at all times radially spaced apart, it is not subject to frictional wear.

From the foregoing description taken with the accompanying drawings it will be apparent that this invention provides a rewind rope starter for small engines that is compact and inexpensive, can be readily arranged to transmit to the engine crankshaft and crankshaft bearings all forces imposed upon the starter mechanism during its use, and is well adapted as an auxiliary hand starter for an engine equipped with an electric starter inasmuch as it does not receive shocks as a result of backfiring of the engine on which it is installed.

Those skilled in the art will appreciate that the invention can be embodied in forms other than as hereindisclosed for purposes of illustration.

The invention is defined by the following claims:

1. In a starter for a reciprocating internal combustion engine by which starting torque can be manually applied to the crankshaft of the engine, said starter being of the type comprising a part which can be rotated by means of a torque applying source external to the engine and which has a helically splined connection with a driving clutch element whereby initial rotation of said part in one direction causes the driving clutch element to be moved axially into engagement with a driven clutch element connected with the crankshaft and further rotation of said part in said direction is imparted to the driven clutch element through the driving clutch element and its helically splined connection with said part, means for inhibiting rotation of the driving clutch element to cause it to move axially relative to said part upon initial rotation of the part, said rotation inhibiting means comprising:
- A. cooperating fixed and movable magnet members, one of said members being a permanent magnet;
- B. means anchoring the fixed magnet member to stationary structure adjacent to the driving clutch element; and
- C. the movable magnet member being carried by the driving clutch element for rotation therewith in proximity to the stationary magnet member.

2. The starter of claim 1, further characterized by:
- D. the fixed magnet member comprising a permanent magnet having radially inwardly facing pole surfaces; and
- E. the movable magnet member being a magnetically permeable substantially gear-shaped part concentrically carried by the driving clutch element and having circumferentially spaced apart radially outwardly projecting pole portions cooperable with the poles of said permanent magnet.

3. The starter of claim 2, further characterized by:
- F. the driving clutch element being molded of plastic and having a cylindrical body portion, and
- G. the movable magnet member being embedded in the body of the driving clutch element with the radially outer surfaces of said pole portions flush with the cylindrical surface of the body.

* * * * *